(12) United States Patent
Lim et al.

(10) Patent No.: US 9,613,471 B2
(45) Date of Patent: Apr. 4, 2017

(54) APPARATUS AND METHOD FOR DIAGNOSING ACTUATORS IN VEHICLE

(71) Applicants: HYUNDAI MOTOR COMPANY, Seoul (KR); KIA MOTORS CORPORATION, Seoul (KR); Research & Business Foundation SUNGKYUNKWAN UNIVERSITY, Suwon-si, Gyeonggi-do (KR)

(72) Inventors: Duck Hyen Lim, Daejeon (KR); Chae Hong Lee, Suwon-si (KR); Young Seo Lee, Suwon-si (KR); Jae Wook Jeon, Suwon-si (KR); Jin Ho Kim, Suwon-si (KR)

(73) Assignees: HYUNDAI MOTOR COMPANY, Seoul (KR); KIA MOTORS CORPORATION, Seoul (KR); RESEARCH & BUSINESS FOUNDATION SUNGKYUNKWAN UNIVERSITY, Gyeonggi-Do (KR)

( * ) Notice: Subject to any disclaimer, the term of this patent is extended or adjusted under 35 U.S.C. 154(b) by 0 days.

(21) Appl. No.: 14/856,331

(22) Filed: Sep. 16, 2015

(65) Prior Publication Data

US 2016/0133063 A1    May 12, 2016

(30) Foreign Application Priority Data

Nov. 12, 2014 (KR) .......................... 10-2014-0157363

(51) Int. Cl.
*B60L 15/20* (2006.01)
*G07C 5/02* (2006.01)
*G07C 5/00* (2006.01)
*G07C 5/08* (2006.01)

(52) U.S. Cl.
CPC ............... *G07C 5/02* (2013.01); *G07C 5/008* (2013.01); *G07C 5/0825* (2013.01)

(58) Field of Classification Search
CPC .. G07C 5/08; B60H 1/00428; B60H 1/00978; H04L 67/12; B60K 6/46; B60K 23/00; B60K 6/48; B60L 15/20; F15B 19/005; B60W 20/00; B60G 17/0185;
(Continued)

(56) References Cited

U.S. PATENT DOCUMENTS 4,924,391 A * 5/1990 Hirano ................. G01R 31/007
701/34.3
5,902,180 A * 5/1999 Sunaga ............. B60H 1/00978
454/121
(Continued)

FOREIGN PATENT DOCUMENTS

JP    7-208259 A    8/1995
JP    9-257859 A    10/1997
(Continued)

*Primary Examiner* — Yuri Kan
(74) *Attorney, Agent, or Firm* — McDermott Will & Emery LLP

(57) ABSTRACT

An apparatus and a method for diagnosing actuators in a vehicle can improve accuracy and reliability of a failure diagnosis by allowing a diagnostic control apparatus in a vehicle to measure power data and implementing a fast diagnosis by reducing a separation time and a diagnosis time of a measurement apparatus.

20 Claims, 8 Drawing Sheets

(58) Field of Classification Search
CPC ...... G01R 31/007; G01M 15/05; B61L 23/34; F02D 35/00
USPC .............. 701/32.8, 2, 31.4; 454/69; 320/134
See application file for complete search history.

(56) References Cited

U.S. PATENT DOCUMENTS

| | | | | |
|---|---|---|---|---|
| 6,128,559 | A * | 10/2000 | Saitou | B61L 23/34 340/436 |
| 6,134,488 | A * | 10/2000 | Sasaki | B60K 23/00 701/32.8 |
| 6,314,375 | B1 * | 11/2001 | Sasaki | G01M 15/05 702/185 |
| 6,958,611 | B1 * | 10/2005 | Kramer | G01R 31/007 324/414 |
| 2002/0003417 | A1 * | 1/2002 | Bito | B60K 6/48 320/152 |
| 2004/0162650 | A1 * | 8/2004 | Kueperkoch | B60G 17/0185 701/29.2 |
| 2007/0050105 | A1 * | 3/2007 | Chinnadurai | H04L 67/12 701/31.4 |
| 2009/0051322 | A1 * | 2/2009 | Kubota | B60K 6/46 320/134 |
| 2011/0022261 | A1 | 1/2011 | Pushkolli et al. | |
| 2013/0317729 | A1 * | 11/2013 | Mitsuyama | F02D 35/00 701/113 |
| 2014/0114516 | A1 * | 4/2014 | Badger | B60W 20/00 701/22 |
| 2014/0297137 | A1 * | 10/2014 | Kinoshita | F15B 19/005 701/51 |
| 2014/0330453 | A1 * | 11/2014 | Nakagawa | B60H 1/00428 701/2 |
| 2014/0379209 | A1 * | 12/2014 | Matsuda | B60L 15/20 701/34.2 |

FOREIGN PATENT DOCUMENTS

| | | |
|---|---|---|
| JP | 10-149493 A | 6/1998 |
| JP | 2007-139478 A | 6/2007 |
| KR | 10-2009-0049492 A | 5/2009 |
| KR | 10-2009-0132288 A | 12/2009 |
| KR | 10-2011-0065215 A | 6/2011 |

* cited by examiner

SCREEN OF DIAGNOSTIC TERMINAL

| VEHICLE MODEL & VID | ▼ |
|---|---|

| EDIT INFORMATION ON ACTUATOR | START DIAGNOSIS | STORE DIAGNOSIS RESULT |
|---|---|---|

1. PLEASE TURN ON ACTUATOR 1
   .................................................NORMAL
2. PLEASE TURN ON ACTUATOR 2
   .................................................NORMAL

⋮

N. PLEASE TURN ON ACTUATOR N
   .................................................NORMAL

FIG.4

APPARATUS AND METHOD FOR DIAGNOSING ACTUATORS IN VEHICLE

CROSS-REFERENCE TO RELATED APPLICATION

This application is based on and claims the benefit of priority to Korean Patent Application No. 10-2014-0157363, filed on Nov. 12, 2014 in the Korean Intellectual Property Office, the disclosure of which is incorporated herein in its entirety by reference.

TECHNICAL FIELD

The present disclosure relates to an apparatus and a method for diagnosing actuators in a vehicle, and more particularly, to an apparatus and a method for diagnosing actuators in a vehicle capable of efficiently diagnosing actuators by using a diagnostic control apparatus in the vehicle.

BACKGROUND

A typical method for diagnosing actuators diagnoses actuators by equipping a holding sensor in a power line connected between a battery and an actuator controller and using an external diagnostic terminal connected to the actuator controller. An inspector manually manipulates the actuators at a driver's seat depending on instructions of the diagnostic terminal and may diagnose the actuators by a method for indirectly measuring power consumption by the holding sensor at the manipulation instant and determining normality/failure of the actuators by receiving and confirming the measured current through the terminal. Therefore, a diagnosis time is delayed due to a separation time of the holding sensor after the diagnosis and measurement errors occur due to an indirect measurement of power consumption, thereby causing misjudgment at the time of the diagnosis. Further, the method causes the measurement errors depending on attachment schemes (position, angle, proximity, and the like of a sensor) for attaching a holding sensor to a battery line by an inspector.

Among the typical methods for diagnosing actuators, there is a method for measuring power at the time of separating the actuators and for measuring power at the time of mounting the actuators, detecting a change of power at this time, and comparing the detected change of power with a reference power value to perform a decision on a failure of the actuators. In this case, when the measurement result is out of a normal decision range, since the actuators need to be mounted again and are diagnosed and then separated, much time and many efforts may be required to diagnose the actuator. Further, a delay due to detachment and attachment of external inspection equipment and the actuators in a vehicle process line which needs to test many vehicles within a limited release time may lead to a reduction of productivity.

SUMMARY OF THE INVENTION

The present disclosure has been made to solve the above-mentioned problems occurring in the prior art while advantages achieved by the prior art are maintained intact.

An aspect of the present disclosure provides an apparatus and a method for diagnosing actuators in a vehicle capable of improving accuracy and reliability of a failure diagnosis by allowing a diagnostic control apparatus in a vehicle to measure power data and implementing a fast diagnosis by reducing a separation time and a diagnosis time of a measurement apparatus which are required in the related art.

Further, another aspect of the present disclosure provides an apparatus and a method for diagnosing actuators in a vehicle capable of easily confirming specified values using a diagnostic control apparatus in a vehicle or diagnosis results of each actuator through a terminal and providing a more efficient and convenient diagnosis process by using the confirmed specified values or diagnosis results in diagnosing a failure of each actuator even after a release of the vehicle.

According to an exemplary embodiment of the present disclosure, an apparatus for diagnosing actuators in a vehicle includes: a communication unit configured to communicate with an external terminal; a storage configured to store a diagnosable vehicle identifier; a diagnostic unit configured to transmit a response to whether a vehicle identifier included in a diagnosis request message received from the external terminal matches the vehicle identifier stored in the storage to the external terminal, receive a reference power value and a tolerance range of an actuator to be diagnosed from the external terminal upon determination that the vehicle identifier included in the diagnosis request message matches the vehicle identifier stored in the storage, store the received reference power value and tolerance range in the storage, and generate a control signal for performing the measurement; and a measurement unit configured to drive the actuator to be diagnosed depending on the control signal to measure power consumption of a battery.

The driving of the actuator to be diagnosed may be performed by an operation of a predetermined switch in the vehicle or may be performed depending on a driving signal from the external terminal.

The diagnostic unit may perform diagnosis logics as much as the number of actuators included in the diagnosis request message, and receive the tolerance range and the reference power value of the corresponding actuator to be diagnosed in each diagnosis logic from the external terminal to decide whether the actuator is out of order.

The diagnostic unit may decide whether the actuator is out of order at a predetermined period until a time defined in a timer expires to transmit a normal decision result to the external terminal when the change of power consumption is kept within the tolerance range of the reference power value.

The diagnostic unit may transmit a failure decision result to the external terminal when there is no change of power consumption until a time defined in a timer expires or when the change of power consumption is out of the tolerance range of the reference power value.

The diagnostic unit may transmit monitoring information including whether to instruct the driving of the corresponding actuator, a change of power consumption, a comparison result of the change of power consumption with the reference power value, or a measurement current or voltage to the external terminal at a predetermined period while a diagnosis on the actuator to be diagnosed is performed.

The communication unit may communicate with the external terminal connected to an on-board diagnostics terminal connected to a vehicle network or a gateway or communicate with the external terminal by wireless communication.

According to another exemplary embodiment of the present disclosure, a terminal for diagnosing actuators in a vehicle by communicating with an apparatus in the vehicle includes: a communication unit configured to communicate with the apparatus in the vehicle; a user interface unit configured to input and output information; a storage configured to store reference power values and tolerance ranges for each actuator to be diagnosed, while being divided depending on a vehicle identifier; and a diagnostic unit configured to transmit a diagnostic request message including the vehicle identifier to the apparatus in the vehicle to transmit the message including the reference power value and the tolerance range of the actuator to be diagnosed to the apparatus in the vehicle depending on a corresponding response received from the apparatus in the vehicle so as to decide whether the actuator is out of order depending on whether a change of power consumption of a battery depending on the driving of the actuator to be diagnosed in the apparatus in the vehicle is within the tolerance range of the reference power value.

The diagnostic unit may transmit input authentication information to the apparatus in the vehicle to perform a control to transmit the diagnostic request message when a response to authentication success is received so as to perform a diagnose in the apparatus in the vehicle.

The diagnosis request message may include information on the number of actuators and the apparatus in the vehicle may perform diagnosis logics as much as the number of actuators and determine whether the actuator is out of order using the reference power value and the tolerance range of the corresponding actuator to be diagnosed in each diagnosis logic transmitted by the diagnostic unit.

The apparatus in the vehicle may return a normal decision result at a predetermined period until a time defined in a timer expires when the change of power consumption is kept within the tolerance range of the reference power value.

The apparatus in the vehicle may return a failure decision result when there is no change of power consumption until a time defined in a timer expires or when the change of power consumption is out of the tolerance range of the reference power value.

The diagnostic unit may receive monitoring information including whether to instruct the driving of the corresponding actuator, a change of power consumption, a comparison result of the change of power consumption with the reference power value, or a measurement current or voltage from the apparatus in the vehicle at a predetermined period while a diagnosis on the actuator to be diagnosed is performed and display the received monitoring information through the user interface unit.

The communication unit may communicate with the apparatus in the vehicle connected to an on-board diagnostics terminal connected to a vehicle network or a gateway or communicate with the apparatus in the vehicle by wireless communication.

According to another exemplary embodiment of the present disclosure, a method for diagnosing actuators in a vehicle includes: transmitting a diagnosis request message including a vehicle identifier from a terminal to the apparatus in the vehicle; transmitting a response to whether a vehicle identifier stored in the apparatus in the vehicle matches a vehicle identifier included in the diagnosis request message to the terminal; if the vehicle identifier stored in the apparatus in the vehicle matches the vehicle identifier included in the diagnosis request message, transmitting a message including a reference power value and a tolerance range of the actuator to be diagnosed from the terminal to the apparatus in the vehicle; driving, by the apparatus in the vehicle, the actuator to be diagnosed to measure power consumption of a battery; and determining whether the actuator is out of order depending on whether a change of power consumption of a battery within the tolerance range of the reference power value.

The method may further include: transmitting authentication information to the apparatus in the vehicle to receive a response to authentication success, prior to the transmitting of the diagnosis request message from the terminal.

The diagnosis request message may include information on the number of actuators and the apparatus in the vehicle may determine performs diagnosis logics as much as the number of actuators and may use the reference power value and the tolerance range of the corresponding actuator to be diagnosed in each diagnosis logic transmitted by the diagnostic unit to determine whether the actuator is out of order.

The determining whether the actuator is out of order is performed for a predetermined period until a time defined in a timer expires to return a normal decision result to the terminal when a change of power consumption is kept within the tolerance range of the reference power value.

The determining whether the actuator is out of order may include returning a failure decision result to the terminal when there is no change of power consumption until a time defined in a timer expires or when the change of power consumption is out of the tolerance range of the reference power value.

The determining whether the actuator is out of order may include transmitting monitoring information including whether to instruct the driving of the corresponding actuator, a change of power consumption, a comparison result of the change of power consumption with the reference power value, or a measurement current or voltage from the apparatus in the vehicle at a predetermined period while a diagnosis on the actuator to be diagnosed is performed and displaying the received monitoring information through the user interface of the terminal through the user interface unit.

BRIEF DESCRIPTION OF THE DRAWINGS

The above and other objects, features and advantages of the present disclosure will be more apparent from the following detailed description taken in conjunction with the accompanying drawings, in which:

FIG. 4 is an example of a screen of the diagnostic terminal of FIG. 1;

DETAILED DESCRIPTION

Figure 1:
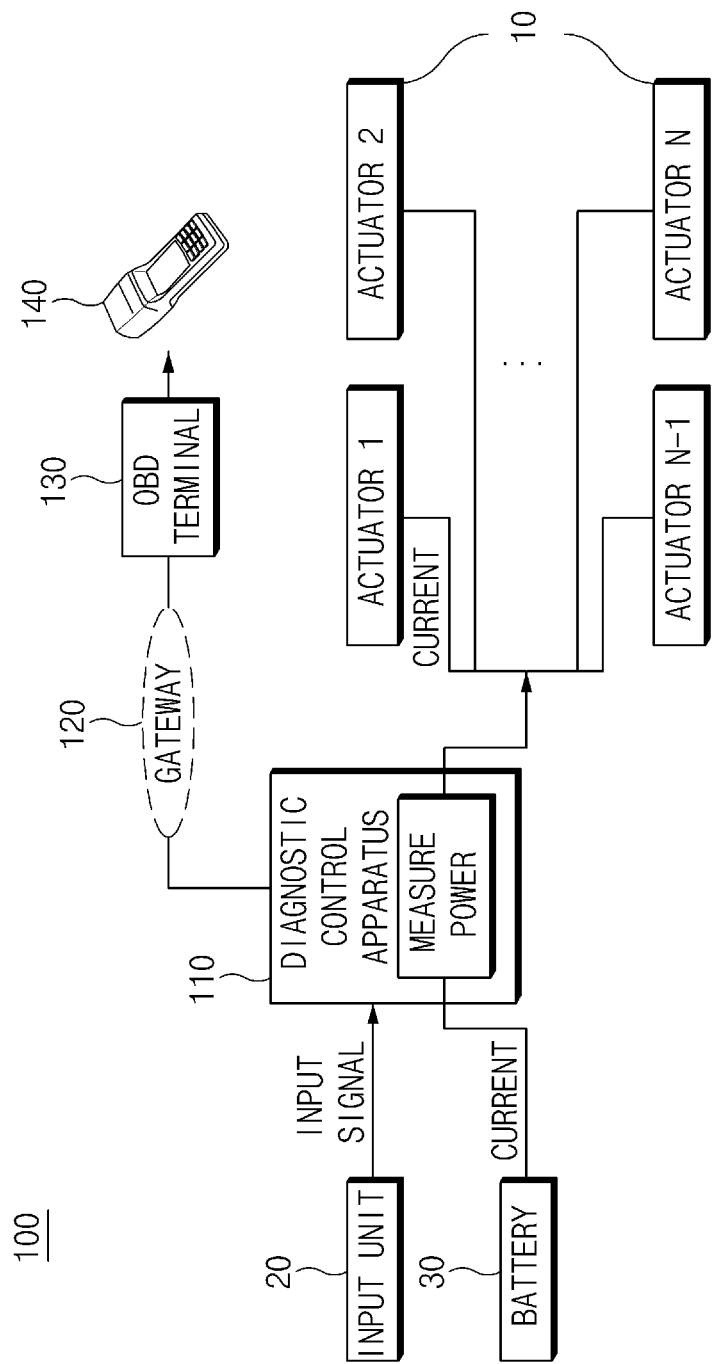
FIG. 1 is a diagram of an apparatus for diagnosing actuators in a vehicle according to an exemplary embodiment of the present disclosure.

Hereinafter, the present disclosure will be described in detail with reference to the accompanying drawings. Throughout the accompanying drawings, the same components will be denoted by the same reference numerals. In addition, a detail description for functions and/or configurations that have been well-known will be omitted. In the following specification, portions required for understanding operations according to various exemplary embodiments will be mainly described, and a description for components that may obscure the gist of the present disclosure will be omitted. In addition, some components in the accompanying drawings may be exaggerated, omitted, or schematically shown. Sizes of the respective components do not reflect actual sizes of the respective components. Therefore, contents mentioned herein are not limited by relative sizes of or intervals between components shown in the accompanying drawings.

FIG. 1 is a diagram of an apparatus 100 for diagnosing actuators in a vehicle according to an exemplary embodiment of the present disclosure.

Referring to FIG. 1, the apparatus 100 for diagnosing actuators in a vehicle according to the exemplary embodiment of the present disclosure may include a diagnostic control apparatus 110 configured to be equipped in the vehicle to control an operation of an actuator 10 supplied with power from a battery 30 depending on a driving signal from a diagnostic terminal 140 or an input unit 20 and perform an overall diagnosis on the actuator, an on-board diagnostics (OBD) terminal 130, and a diagnostic terminal 140 and may further include a gateway 120 if necessary.

The OBD terminal 130 is a terminal which may be connected to a vehicle controller area network (CAN) or other vehicle networks to transmit and receive required signals to and from external devices. The diagnostic terminal 140 may be connected to the OBD terminal 130 to exchange required data with the diagnostic control apparatus 110 which is connected to the CAN or the vehicle network. However, when the CAN or the vehicle network is provided with the gateway 120 to relay communications, the diagnostic terminal 140 connected to the OBD terminal 130 may exchange the required data with the diagnostic control apparatus 110 through the gateway 120. The gateway 120 may be an apparatus which relays the communications between the diagnostic control apparatus 110 and the diagnostic terminal 140 and relays communications between other electronic devices on the CAN or the vehicle network which performs communications by the same communication scheme.

That is, the diagnostic terminal 140 may exchange data with the diagnostic control apparatus 110 depending on a user manipulation to request a diagnosis and receive the corresponding response and exchange data for diagnosing actuators in a vehicle such as transmitting reference power and a tolerance range of the actuator and receiving diagnosis results on whether the actuator is out of order. In particular, the diagnostic control apparatus 110 may receive a diagnosis request for at least one actuator 10 from the diagnostic terminal 140 to measure power consumption of the battery 30 due to the corresponding actuator and transmit the diagnosis results to the diagnostic terminal 140.

The driving signal for operating (turning on) the corresponding actuators to be diagnosed by the diagnostic control apparatus 110 may be input from the input unit 20 or the diagnostic terminal 140. The input unit 20 may be a multi-function steering wheel (MFSW) switch and may also be other switches in a vehicle for driving other actuators. For example, the actuator for operating a direction indicator, a tail lamp, a high beam, a wiper, and the like may be operated by the MFSW switch and the actuator for operating an opening and closing of a door, an opening and closing of a window, a heater, an air conditioner, and the like may be operated by other switches in a vehicle.

For example, before a vehicle is released, the corresponding actuator 10 is operated by being supplied with the power from the battery 30 depending on the driving signal transmitted from the diagnostic terminal 140, such that the diagnostic control apparatus 110 may measure the power consumption of the battery 30 due to the corresponding actuator and transmit the diagnosis results to the diagnostic terminal 140, depending on the diagnosis request on the corresponding actuator 10 from the diagnostic terminal 140.

Alternatively, after a vehicle is released, the corresponding actuator 10 is operated by being supplied with the power from the battery 30 depending on the driving signal by the operation of the switch of the input unit 20, such that the diagnostic control apparatus 110 may measure the power consumption of the battery 30 due to the corresponding actuator and transmit the diagnosis results to the diagnostic terminal 140, depending on the diagnosis request on the corresponding actuator 10 from the diagnostic terminal 140.

Figure 2:
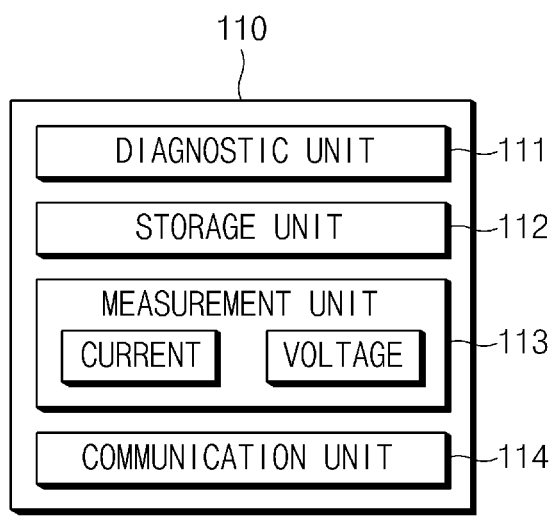
FIG. 2 is a detailed block diagram of a diagnostic control apparatus of FIG. 1.

FIG. 2 is a detailed block diagram of the diagnostic control apparatus 110 of FIG. 1. Referring to FIG. 2, the diagnostic control apparatus 110 may include a diagnostic unit 111, a storage 112, a measurement unit 113, and a communication unit 114.

The communication unit 114 may include a module which communicates with the diagnostic terminal 140 connected to the OBD terminal 130 through a wired line such as serial data communication. In some cases, to provide communications by near field communications such as Bluetooth, Zigbee, and NFC, the Internet, or mobile communications such as WiFi and WCDMA without the OBD terminal 130, a communication unit of the diagnostic control apparatus 110 and the diagnostic terminal 140 may also include a communication module for supporting the corresponding wireless communication.

The diagnostic unit 111 may receive messages for a diagnosis request, a notification of a reference power value or a tolerance range of the actuator, and the like which are transmitted by the diagnostic terminal 140 through the communication unit 114 and store the received message in the storage 112. In addition, the storage 112 may previously store and manage diagnosable vehicle identifiers (VIDs) which are assigned depending on option specifications, authentication information, and the like. However, in order for an unauthorized user to limit diagnosing each actuator, when the diagnostic unit 111 receives authentication information, such as an authentication identifier, a password, and the like for authentication, from the diagnostic terminal 140, the diagnostic unit 111 may determine whether the received information matches the authentication information of the storage 112 to transmit a response to authentication success or authentication failure to the diagnostic terminal 140. When the diagnostic unit 111 transmits the response to the authentication success, the diagnostic unit 111 may communicate with the diagnostic terminal 140 to start a diagnosis.

The measurement unit 113 measures consumption current and voltage of the actuator to be diagnosed depending on the diagnosis request message to measure the power consumption of the battery. The measurement of current and voltage may be measured using the mounted circuit, sensor, and the like and a voltage may also be received from the battery management system, an engine control unit, or the like on a vehicle network.

The diagnostic unit 111 compares the power change after and before the driving of the actuator to be diagnosed with the reference power value stored in the storage 112 based on the power consumption measured by the measurement unit 113 to determine that the actuator is normal when the compared result is within the tolerance range and to determine that the actuator is out of order when the compared result is out of the tolerance range. Finally, the diagnosis results including the corresponding measurement current (including the measurement voltage), the decision result, and the like are transmitted to the diagnostic terminal 140 through the communication unit 114.

Figure 3:
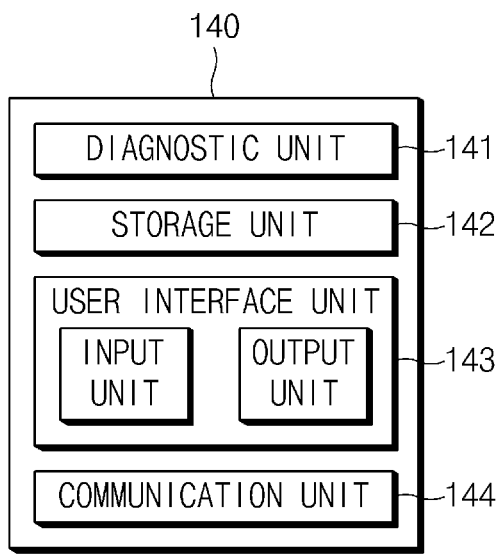
FIG. 3 is a detailed block diagram of a diagnostic terminal of FIG. 1.

FIG. 3 is a detailed block diagram of the diagnostic terminal 140 of FIG. 1. Referring to FIG. 3, the diagnostic terminal 140 may include a diagnostic unit 141, a storage 142, a user interface unit 143, and a communication unit 144.

The storage 142 stores and manages the reference power value or the tolerance range of the actuator which is input by the user. The information of the storage 142 is classified depending on the vehicle IDs (VIDs) which are assigned depending on vehicle models and option specifications and thus the storage 142 may store and manage names or kinds of actuators to be diagnosed.

The information which is stored in the storage 142 may be input through the input unit (e.g. touch screen, keypad, keyboard, and the like) of the user interface unit 143 and may be modified or changed if necessary. In this case, the information stored in the storage 142 may be input, edited, and the like using a display of a graphic user interface (GUI) type which is an output unit of the user interface unit 143.

The communication unit 144 may include a module which communicates with the diagnostic control apparatus 110 through a wired line such as serial data communication. In some cases, to provide communications by near field communications such as Bluetooth, Zigbee, and NFC or mobile communications such as WiFi and WCDMA without the OBD terminal 130, a communication unit of the diagnostic control apparatus 110 and the diagnostic terminal 140 may also include a communication module for supporting the corresponding wireless communication.

The diagnostic unit 141 may transmit a diagnosis request message or a message for the notification of the reference power value or the tolerance range, or the like of the corresponding actuator of the storage 142 to the diagnostic control apparatus 110 through the communication unit 144, depending on an input of the diagnosis start, and the like by the user through the user interface unit 143. However, as described to be below, in order for the unauthorized user to limit diagnosing each actuator, the diagnostic unit 111 may perform a security authentication procedure if necessary and then transmit the diagnosis request message, and the like through the GUI, and the like, of the user interface unit 143.

Therefore, when the diagnosis results for the corresponding actuator(s) which is (are) performed by the diagnostic unit 111 of the diagnostic control apparatus 110 are received through the communication unit 144, the diagnosis results may be displayed on the display of the GUI type which is the output unit of the user interface unit 143.

The diagnostic unit 141 may also store the diagnosis results received through the communication unit 144 as described above in the storage 142 and transmit the diagnosis results to a server on the Internet through a network such as the near field communication, the Internet, or the mobile communication, such that the server may collect and manage the diagnosis results of each actuator and if necessary, may also provide the corresponding inquiry information depending on the inquiry request, and the like, using the user terminal, and the like.

FIG. 4 is an example of a screen of the diagnostic terminal 140 of FIG. 1. As illustrated in FIG. 4, the display screen of the GUI type of the diagnostic terminal 140 includes a vehicle model and VID selection button, an actuator information edition button, a diagnosis start button, a diagnosis result storage button, and the like and may cope with the diagnosis of the actuators of all the vehicles.

The user may select the vehicle model and the VID selection button to input the vehicle IDs (VIDs) which are assigned depending on vehicle models and option specifications and may select the actuator information edition button to store and manage the reference power values, the tolerance ranges, and the like of the actuators for each name or kind of actuators in the storage 142.

When the user selects the diagnosis start button, the diagnosis request message, the message for the notification of the reference power value, the tolerance range, and the like of the actuator, and the like are transmitted to the diagnostic control apparatus 110, such that when the diagnosis results on the corresponding actuator (s) which is (are) performed by the diagnostic unit 111 of the diagnostic control apparatus 110 are received, the received diagnosis result (s) may be displayed on the display of the GUI type which is the output unit of the user interface unit 143. The diagnostic control apparatus 110 notifies the diagnostic terminal 140 of monitoring information including a diagnosis process such as whether to instruct the driving of the actuator, the power change measured by the measurement unit 113, the comparison result of the measured power with the reference power value stored in the storage 112, and a change trend of the measurement current (including the measurement voltage), the diagnosis results, and the like while the diagnosis of the diagnostic control apparatus 110 is performed, such that the user may monitor the diagnosis process through a separate message window, and the like of the display of the user interface unit 143.

Finally, when the diagnosis is completed, the user may select the diagnosis result storage button to database and store the accumulated diagnosis results (including the information of the diagnosis process) on the actuators in the storage 142 (for example, embedded memory, external memory) or transfer the databased and stored diagnosis results to the server on the Internet through the communication unit 144, such that the server may collect the diagnosis results of each actuator and database and manage the collected diagnosis results and if necessary, may also provide the corresponding inquiry information depending on the inquiry request, and the like using the user terminal, and the like of the network.

Hereinafter, operations of the diagnostic control apparatus 110 and the diagnostic terminal 140 will be described in more detail with reference to FIGS. 5 to 8.

Figure 5:
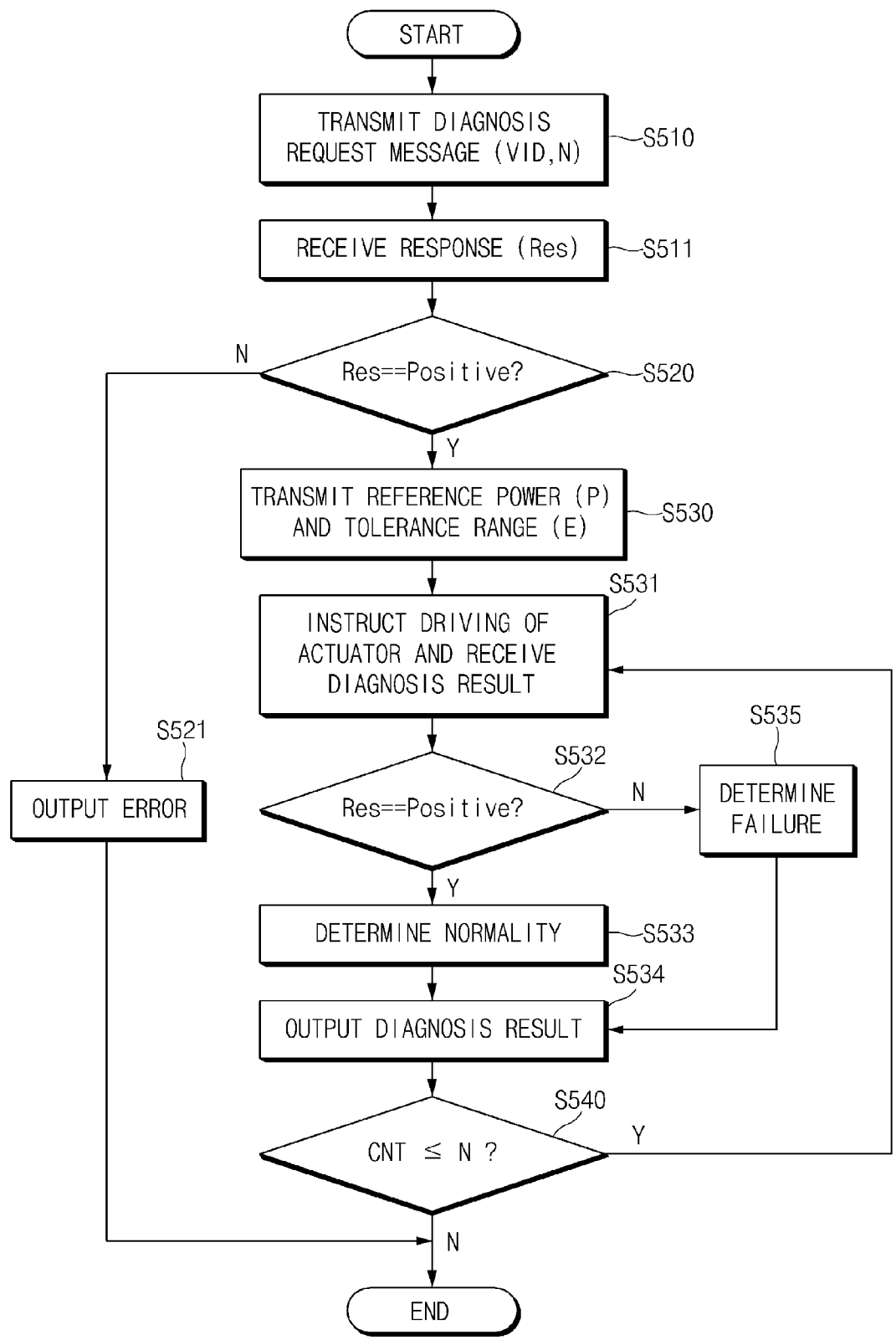
FIG. 5 is a flow chart for describing the operation of the diagnostic terminal 140 of FIG. 1.

FIG. 5 is a flow chart for describing the operation of the diagnostic terminal 140 of FIG. 1.

The diagnostic unit 141 may transmit the corresponding diagnosis request message of the storage 142 to the diagnostic control apparatus 110 through the communication unit 144 depending on the input of the diagnosis start, and the like by the user through the user interface unit 143 (S510). The diagnosis request message may include the vehicle IDs (VIDs) which are assigned depending on the vehicle model and the option specifications, information N on the number of actuators, and the like and may also include information on names, kinds, and the like of actuators to be diagnosed in addition thereto, if necessary. However, in order for the unauthorized user to limit diagnosing each actuator, the user may transmit the diagnosis request message through the GUI, and the like of the user interface unit 143 after suffering from the security authentication procedure. For example, the authentication information such as an authentication identifier and a password may be previously registered in the storage 142 and the corresponding authentication information is input on an initial authentication screen of the user interface unit 143 to provide the GUI screen required for a diagnosis as illustrated in FIG. 4. In addition to this, when the diagnostic unit 141 transmits the corresponding authentication information to the diagnostic control apparatus 110 and receives the response to the authentication success from the diagnostic control apparatus 110, as illustrated in FIG. 4, the GUI screen required for diagnosis is provided and thus subsequent processes such as the diagnosis request message may be transmitted.

Next, when the corresponding response is received from the diagnostic control apparatus 110 (S511), the diagnostic unit 141 may perform a subsequent process for diagnosis when the corresponding response is a predetermined normal positive response (S520) and output predetermined error messages through the user interface unit 143 (S521) when the corresponding response is a predetermined negative response (S520).

Figure 6:
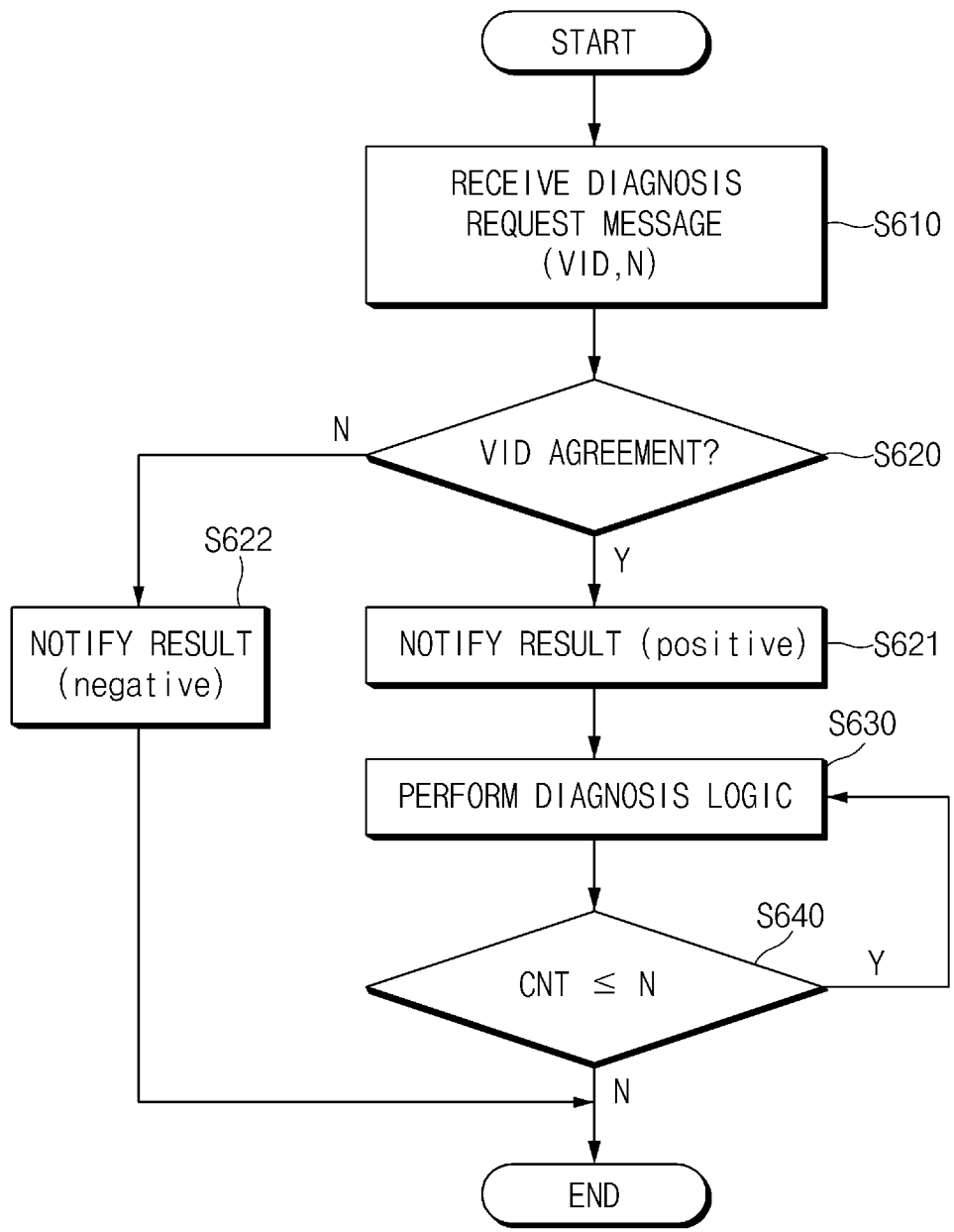
FIG. 6 is a flow chart for describing an operation of the diagnostic control apparatus 110 of FIG. 1.

When receiving the normal positive response from the diagnostic control apparatus 110, the diagnostic unit 141 may transmit a message including a reference power value P and a tolerance range E of an actuator to be diagnosed of the storage 142 for diagnosing the actuator to the diagnostic control apparatus 110 through the communication unit 144 (S530). The transmission of the message is conducted for each diagnosis logic as illustrated in FIG. 6. Further, the diagnostic unit 141 may transmit the driving signal for driving the actuator 10. As described above, before the vehicle is released, the diagnostic unit 141 may transmit the driving signal of the actuator 10 and after the vehicle is released, may also drive the actuator 10 depending on the driving signal generated by the operation of the switch of the input unit 20 in the vehicle. The driving signal of the actuator 10 may be displayed on the output unit of the user interface unit 143 in the GUI type. In addition to this, when the diagnosis process for the corresponding actuator(s) which is performed by the diagnostic unit 111 of the diagnostic control apparatus 110 is received through the communication unit 144, the diagnosis process may be displayed on the display of the GUI type of the user interface unit 143 (S531). The diagnostic control apparatus 110 may notify the diagnostic terminal 140 of the information including the diagnosis process such as whether to instruct the driving of the actuator, the power change measured by the measurement unit 113, the comparison result of the power change with the reference power value stored in the storage 112, and the change trend of the measurement current (including the measurement voltage), the diagnosis results, and the like while the diagnosis of the diagnostic control apparatus 110 is performed.

In particular, when receiving the decision result on the actuator to be diagnosed from the diagnostic control apparatus 110 (S532), the diagnostic unit 141 displays the normal decision result (positive) (including the information of the diagnosis process) (S533) on the display and stores the displayed decision result in the storage 142, the server on the Internet, or the like (S534). The failure decision result (negative) (including the information of the diagnosis process) (S535) is also displayed on the display and is stored in the storage 142, the server on the Internet, or the like (S534).

A frequency of the diagnosis processes S530 to S534 as described above may be counted by a predetermined counter and the above diagnosis process may be sequentially performed on the actuators one by one until the number (CNT) of counts reaches the number (N) of actuators (S540).

FIG. 6 is a flow chart for describing the operation of the diagnostic control apparatus 110 of FIG. 1.

When the diagnostic unit 111 of the diagnostic control apparatus 110 receives the diagnosis request message including the vehicle IDs (VIDs) which are assigned depending on the vehicle model and the option specifications, the information on the number (N) of actuators, and the like (S610) from the diagnostic terminal 140, it is determined whether the received VID matches the diagnosable vehicle ID (VID) which is stored in the storage 112 (S620) to transmit (return) the predetermined normal positive response to the diagnostic terminal 140 if it is determined that the received VID matches the diagnosable vehicle ID (VID) (S621), and otherwise transmits (returns) the predetermined negative response to the diagnostic terminal 140 (S622).

If it is determined that the received VID matches the diagnosable vehicle ID (VID) which is stored in the storage 112, the diagnostic unit 111 may perform the diagnosis logic (S630) and calls the diagnosis logic as much as the number N of actuators to be diagnosed to sequentially perform the diagnosis logics on the actuators to be diagnosed one by one (S640).

Figure 7:
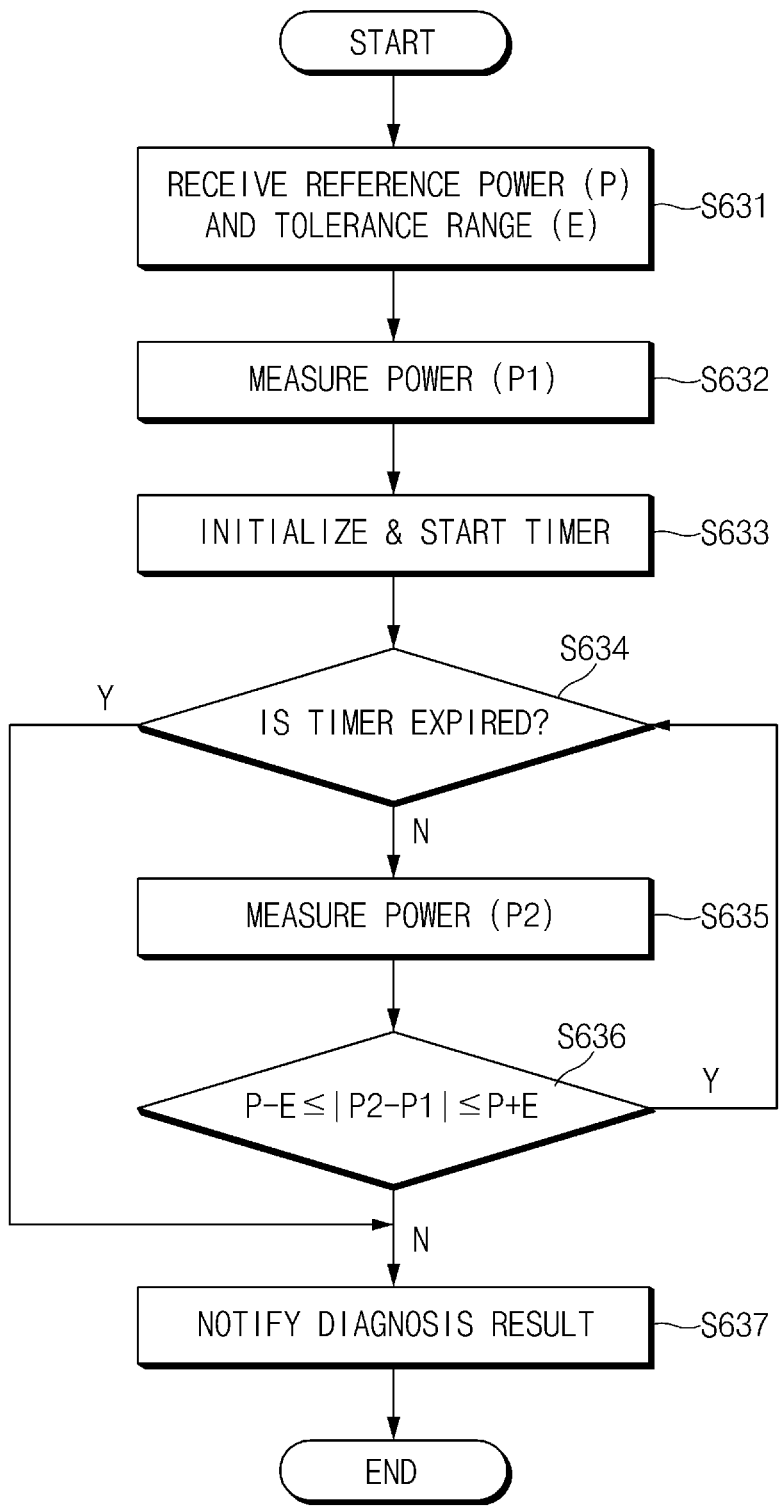
FIG. 7 is a flow chart for describing an operation of diagnosis logic of an operation of the diagnostic control apparatus 110 of FIG. 6.

FIG. 7 is a flow chart for describing the operation of the diagnosis logic (S630) on the diagnostic control apparatus 110 of FIG. 6.

The diagnostic unit 111 of the diagnostic control apparatus 110 may receive the message including the reference power value P and the tolerance range E of the actuator to be diagnosed from the diagnostic terminal 140 in connection with the current actuator to be diagnosed and generate a control signal to allow the measurement unit 113 to perform the measurement for diagnosis (S631).

First, the measurement unit 113 measures current power consumption (P1) of the battery 30 before the actuator to be diagnosed depending on the diagnosis request message is driven and stores the measured power consumption P1 in the storage 112 (S632).

Next, the measurement unit 113 drives the actuator to be diagnosed and starts a predetermined timer (S633) to start to measure the power consumption up to a predetermined time (S634). Before the vehicle is released, the measurement unit 113 may drive the actuator depending on the driving signal controlling the driving start of the actuator to be diagnosed which is transmitted from the diagnostic terminal 140 and after the vehicle is released, the measurement unit 113 may also drive the actuator depending on the driving signal by the operation of the switch of the input unit 20.

The measurement unit 113 measures power consumption P2 of the battery 30 after the driving of the actuator to be diagnosed (S635) and when a (absolute value) difference from the power consumption P1 before the driving of the actuator is within the tolerance range of the reference power value (P±E) (S636), the diagnostic unit 111 may perform a repetitive decision at a predetermined period until the time defined by the timer expires (S634) and thus when the corresponding difference is within the tolerance range of the reference power value (P±E), may transmit the normal decision result to the diagnostic terminal 140, along with the corresponding measurement current (including measurement voltage), and the like (S637).

Further, the diagnostic unit 111 may transmit the failure decision result to the diagnostic terminal 140, along with the corresponding measurement current (including measurement voltage) (S637) when there is no (absolute value) difference (for example, when the actuator is not driven, P2−P1=0) from the power consumption (P1) before the driving of the actuator until the time defined in the timer expires or when the difference is out of the tolerance range of the reference power value even before the corresponding time of the timer (S636).

The diagnostic unit 111 may notify the diagnostic terminal 140 of the information including the diagnosis process, such as whether to instruct the driving of the actuator, the power change measured by the measurement unit 113, the comparison result of the power change with the reference power value stored in the storage 112, and the change trend of the measurement current (including the measurement voltage), the diagnosis results, and the like, at a predetermined period while the diagnosis is performed.

Figure 8:
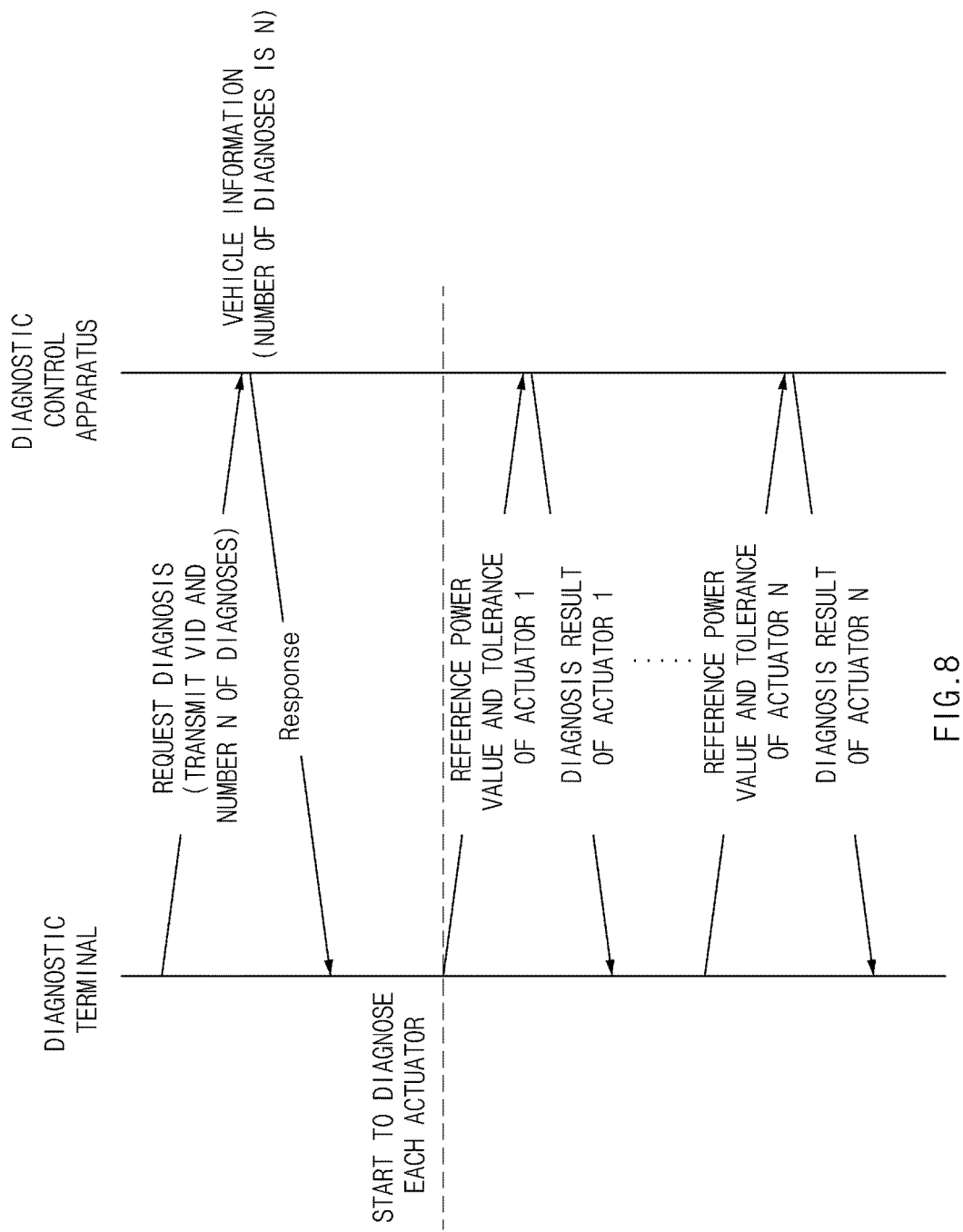
FIG. 8 is a flow chart illustrating a signal sequence during a diagnosis process between the diagnostic terminal 140 and the diagnostic control apparatus 110 of FIG. 1.

FIG. 8 is a flow chart illustrating a signal sequence during the diagnosis process between the diagnostic terminal 140 and the diagnostic control apparatus 110 of FIG. 1.

As illustrated in FIG. 8, the diagnostic control apparatus 110 receiving the diagnosis request message including the vehicle IDs (VIDs) which are assigned depending on the vehicle model and the option specifications, the information on the number (N) of actuators, and the like from the diagnostic terminal 140 determines whether the received VID matches the diagnosable vehicle ID (VID) stored in the storage 112 to transmit the positive response or the negative response to the diagnostic terminal 140, thereby confirming match or mismatch of the configuration state of the actuator of the vehicle model.

After transmitting the VID, the information on the number (N) of actuators, and the like to be fitted for the configuration state of the current actuator of a vehicle model, the diagnostic terminal 140 may transmit the message including the reference power value P and the tolerance range E of the actuator to be diagnosed to start the diagnosis to the diagnostic control apparatus 110 and the diagnostic control apparatus 110 may start to measure the change of power consumption depending on the driving of the actuator to be diagnosed to transmit the decision result to the diagnostic terminal 140 through the diagnosis as illustrated in FIG. 7, along with the corresponding measurement current (including the measurement voltage).

The diagnostic control apparatus 110 may call the diagnosis logics as much as the number (N) of actuators to be diagnosed to sequentially perform the diagnosis logics on the actuators to be diagnosed one by one. In each diagnosis logic, before the vehicle is released, the diagnostic control apparatus 110 may drive the actuator depending on the driving signal controlling the driving start of the actuator to be diagnosed which is transmitted from the diagnostic terminal 140 and after the vehicle is released, may also drive the actuator depending on the driving signal by the operation of the switch of the input unit 20.

By the above method, the diagnostic terminal 140 receives the monitoring information including the diagnosis process such as whether to instruct the driving of the actuator, the power change measured by the measurement unit 113, the comparison result of the power change with the reference power value stored in the storage 112, and the change trend of the measurement current (including the measurement voltage), the diagnosis results, and the like while the diagnosis is performed and thus displays the monitoring information on the GUI display, such that the user may monitor the monitoring information and store the monitoring information in the storage 142, the server on the Internet, or the like to inquiry the monitoring information later at any time.

As described above, in the apparatus 100 for diagnosing actuators in a vehicle in accordance with the exemplary embodiments of the present disclosure, it is possible to improve the accuracy and reliability of the failure diagnosis by allowing the diagnostic control apparatus 110 in the vehicle to measure the power data, implement the fast diagnosis by reducing the separation time and the diagnosis time of the measurement apparatus such as the holding sensor, and the like which are required in the related art and provide the more efficient and convenient diagnosis process by using the confirmed specified values or diagnosis results in diagnosing the failure of each actuator even after the release of the vehicle.

According to the apparatus and method for diagnosing actuators in a vehicle in accordance with the exemplary embodiments of the present disclosure, it is possible to improve the accuracy and reliability of the failure diagnosis by allowing the diagnostic control apparatus in the vehicle to measure the power data, implement the fast diagnosis by reducing the separation time and the diagnosis time of the measurement apparatus which are required in the related art and provide the more efficient and convenient diagnosis process by using the confirmed specified values or diagnosis results in diagnosing the failure of each actuator even after the release of the vehicle.

The diagnostic unit 111, the measurement unit 113, and the communication unit 114 may be implemented with a processor having instructions to perform above-described functions thereof.

Hereinabove, although the present disclosure has been described by specific matters such as detailed components, and the like, exemplary embodiments, and the accompanying drawings, they have been provided only for assisting in the entire understanding of the present disclosure. Therefore, the present disclosure is not limited to the above-mentioned exemplary embodiments, but may be variously modified and altered by those skilled in the art to which the present disclosure pertains without departing from the spirit and scope of the present disclosure. Therefore, the present disclosure is not to be limited to the above-mentioned exemplary embodiments. That is, the following claims as well as all contents modified equally or equivalently to the claims are to fall within the scopes and spirits of the disclosure.

What is claimed is:

1. An apparatus for diagnosing actuators in a vehicle, comprising:
    a communication unit configured to communicate with an external terminal;
    a storage configured to store a diagnosable vehicle identifier;
    a diagnostic unit configured to transmit a response to whether a vehicle identifier included in a diagnosis request message received from the external terminal matches the vehicle identifier stored in the storage to the external terminal, receive a reference power value and a tolerance range of an actuator to be diagnosed to determine whether the actuator is out of order from the external terminal upon determination that the vehicle identifier included in the diagnosis request message matches the vehicle identifier stored in the storage, store the received reference power value and tolerance range in the storage, and generate a control signal for performing a measurement; and
    a measurement unit configured to drive the actuator to be diagnosed depending on the control signal to measure power consumption of a battery, wherein the diagnostic unit determines whether the actuator is out of order depending on whether a change of power consumption is within a tolerance range of the reference power value.

2. The apparatus according to claim 1, wherein the driving of the actuator to be diagnosed is performed by an operation of a predetermined switch in the vehicle or is performed depending on a driving signal from the external terminal.

3. The apparatus according to claim 1, wherein the diagnostic unit performs diagnosis logics as much as a number of actuators included in the diagnosis request message, and receives the tolerance range and the reference power value of a corresponding actuator to be diagnosed in each diagnosis logic from the external terminal.

4. The apparatus according to claim 1, wherein the diagnostic unit determines whether the actuator is out of order at a predetermined period until a time defined in a timer expires to transmit a normal decision result to the external terminal when the change of power consumption is kept within the tolerance range of the reference power value.

5. The apparatus according to claim 1, wherein the diagnostic unit transmits a failure decision result to the external terminal, when there is no change of power consumption until a time defined in a timer expires or when the change of power consumption is out of the tolerance range of the reference power value.

6. The apparatus according to claim 1, wherein the diagnostic unit transmits monitoring information including whether to instruct the driving of a corresponding actuator, the change of power consumption, a comparison result of the change of power consumption with the reference power value, or a measurement current or voltage to the external terminal at a predetermined period while a diagnosis on the actuator to be diagnosed is performed.

7. The apparatus according to claim 1, wherein the communication unit communicates with the external terminal connected to an on-board diagnostics terminal connected to a vehicle network or a gateway, or communicates with the external terminal by wireless communication.

8. A terminal for diagnosing actuators in a vehicle by communicating with an apparatus in the vehicle, comprising:
a communication unit configured to communicate with the apparatus in the vehicle;
a user interface unit configured to input and output information;
a storage configured to store reference power values and tolerance ranges for each actuator to be diagnosed, while being divided depending on a vehicle identifier; and
a diagnostic unit configured to transmit a diagnostic request message including the vehicle identifier to the apparatus in the vehicle, and transmit a message including the reference power value and a tolerance range of an actuator to be diagnosed to the apparatus in the vehicle depending on a corresponding response received from the apparatus in the vehicle so as to determine whether the actuator is out of order depending on whether a change of power consumption of a battery depending on a driving of the actuator to be diagnosed in the apparatus in the vehicle is within a tolerance range of the reference power value.

9. The terminal according to claim 8, wherein the diagnostic unit transmits input authentication information to the apparatus in the vehicle to perform a control to transmit the diagnostic request message when a response to authentication success is received so as to perform a diagnose in the apparatus in the vehicle.

10. The terminal according to claim 8, wherein the diagnosis request message includes information on a number of actuators and the apparatus in the vehicle performs diagnosis logics as much as the number of actuators and determines whether the actuator is out of order using the reference power value and the tolerance range of a corresponding actuator to be diagnosed in each diagnosis logic transmitted by the diagnostic unit.

11. The terminal according to claim 8, wherein the apparatus in the vehicle returns a normal decision result at a predetermined period until a time defined in a timer expires, when the change of power consumption is kept within the tolerance range of the reference power value.

12. The terminal according to claim 8, wherein the apparatus in the vehicle returns a failure decision result when there is no change of power consumption until a time defined in a timer expires or when the change of power consumption is out of the tolerance range of the reference power value.

13. The terminal according to claim 8, wherein the diagnostic unit receives monitoring information including whether to instruct the driving of a corresponding actuator, the change of power consumption, a comparison result of the change of power consumption with the reference power value, or a measurement current or voltage from the apparatus in the vehicle at a predetermined period while a diagnosis on the actuator to be diagnosed is performed, and displays the received monitoring information through the user interface unit.

14. The terminal according to claim 8, wherein the communication unit communicates with the apparatus in the vehicle connected to an on-board diagnostics terminal connected to a vehicle network or a gateway, or communicates with the apparatus in the vehicle by wireless communication.

15. A method for diagnosing actuators in a vehicle, comprising steps of:
transmitting a diagnosis request message including a vehicle identifier from a terminal to an apparatus in the vehicle;
transmitting a response to whether a vehicle identifier stored in the apparatus in the vehicle matches the vehicle identifier included in the diagnosis request message to the terminal;
if the vehicle identifier stored in the apparatus in the vehicle matches the vehicle identifier included in the diagnosis request message, transmitting a message including a reference power value and a tolerance range of the actuator to be diagnosed to determine whether the actuator is out of order from the terminal to the apparatus in the vehicle;
driving, by the apparatus in the vehicle, the actuator to be diagnosed to measure power consumption of a battery; and
determining whether the actuator is out of order depending on whether a change of power consumption of a battery within a tolerance range of the reference power value.

16. The method according to claim 15, further comprising:
transmitting authentication information to the apparatus in the vehicle to receive a response to authentication success, prior to the transmitting of the diagnosis request message from the terminal.

17. The method according to claim 15, wherein the diagnosis request message includes information on the number of actuators and the apparatus in the vehicle determines whether the actuator is out of order depending on whether the change of power consumption is within the tolerance range of the reference power value, performs diagnosis logics as much as the number of actuators and uses the reference power value and a tolerance range of a corresponding actuator to be diagnosed in each diagnosis logic transmitted from the terminal to determine whether the actuator is out of order.

18. The method according to claim 15, wherein the determining whether the actuator is out of order is performed for a predetermined period until a time defined in a timer expires to return a normal decision result to the terminal when the change of power consumption is kept within the tolerance range of the reference power value.

19. The method according to claim 15, wherein the step of determining whether the actuator is out of order includes returning a failure decision result to the terminal when there is no change of power consumption until a time defined in a timer expires or when the change of power consumption is out of the tolerance range of the reference power value.

20. The method according to claim 15, wherein the step of determining whether the actuator is out of order includes transmitting monitoring information including whether to instruct the driving of a corresponding actuator, the change of power consumption, a comparison result of the change of power consumption with the reference power value, or a measurement current or voltage from the apparatus in the vehicle at a predetermined period while a diagnosis on the actuator to be diagnosed is performed, and displaying the received monitoring information through the user interface of the terminal.

* * * * *